United States Patent

Chaudhuri et al.

[11] Patent Number: 5,806,061
[45] Date of Patent: Sep. 8, 1998

[54] METHOD FOR COST-BASED OPTIMIZATION OVER MULTIMEIDA REPOSITORIES

[75] Inventors: Surajit Chaudhuri, Redmond, Wash.; Luis Gravano, Mountain View, Calif.

[73] Assignee: Hewlett-Packard Company, Palo Alto, Calif.

[21] Appl. No.: 859,556

[22] Filed: May 20, 1997

[51] Int. Cl.[6] ................................................. G06F 17/00
[52] U.S. Cl. .............................. 707/3; 707/616; 707/501; 345/328
[58] Field of Search .......................... 707/1–10, 100–104, 707/200–206, 500–516; 395/200.3, 200.83; 345/326–358

[56] References Cited

U.S. PATENT DOCUMENTS

| | | | |
|---|---|---|---|
| 5,640,560 | 6/1997 | Smith | 707/104 |
| 5,664,227 | 9/1997 | Mauldin et al. | 707/516 |
| 5,684,954 | 11/1997 | Kaiserwerth et al. | 395/200.66 |
| 5,706,290 | 1/1998 | Shaw et al. | 345/328 |
| 5,712,906 | 1/1998 | Grady et al. | 348/12 |
| 5,727,950 | 3/1998 | Cook et al. | 434/350 |
| 5,737,595 | 4/1998 | Cohen et al. | 395/611 |

*Primary Examiner*—Thomas G. Black
*Assistant Examiner*—David Yeub Jung

[57] ABSTRACT

A method for optimizing the cost of searches through a multimedia repository is disclosed where the repository contains a plurality of objects having at least two different attributes such as color in a newspaper photograph and text in the subtitle. The method comprises selecting a ranking expression, translating the ranking expression into resulting filter conditions and then optimizing the resulting filter conditions to perform the search. A database look-up step is included which determines the cost of performing searches over the various subconditions of the filter condition. The least costly subcondition is searched first to retrieve objects from the multimedia repository. The remaining subconditions are then evaluated on the retrieved objects using either a search step or probe step depending upon the determined cost to perform each. A further database look-up step predicts a grade of match necessary in the translated ranking expression to retrieve at least the number of objects requested in the search.

18 Claims, 6 Drawing Sheets

| ATTRIBUTE | ATOMIC CONDITION | INDEX |
|---|---|---|
| Category | • State Water Project<br>• Recreation | O1, O3, O4, O5, O7, O8, O9, O10<br>O2, O6 |
| Location | • Northern California<br>• Southern California | O1, O2, O5, O7, O10<br>O3, O4, O6, O8, O9 |
| Color | • Mostly Blue<br>• Mostly Green<br>• Mostly Red | O4, O6, O7, O9<br>O1, O3, O5, O10<br>O2, O8 |
| Photo Caption | Individual Words | |

FIG. 1

METHOD FOR COST-BASED OPTIMIZATION OVER MULTIMEIDA REPOSITORIES

BACKGROUND OF THE INVENTION

This invention relates generally to data retrieval from computer databases and more particularly to a method and apparatus for reducing search costs across multimedia repositories.

The problem of content management of multimedia repositories is becoming increasingly important with the development of multimedia applications. For example, digitization of photo and art collections is becoming popular, multimedia mail and groupware applications are getting widely available, and satellite images are being used for weather predictions. To access such large repositories efficiently, there is a need to store information on attributes of the multimedia objects. Such attributes range from the date the multimedia object was authored, a free text description of the object, and features like color histograms, for example. These attributes provide the ability to recall one or more objects from the repository.

There are at least three major ways in which accesses to a multimedia repository differ from that to a structured database (e.g., a relational database). First, rarely does a user expect an exact match with the feature of a multimedia object (e.g., color histogram). Rather, an object does not either satisfy or fail a condition, but has instead an associated "grade of match". Thus, an atomic filter condition will not be an equality between two values (e.g., between a given color $c_0$ and the color oid color of an object with identifier oid), but instead an inequality involving the grade of match between the two values and some target grade (e.g., Grade (color, $c_0$(oid))>0.7). Next, every condition on the attributes of a multimedia object may only be evaluated through an index. This is in contrast to a traditional database where, after accessing a tuple from the repository, all selection predicates can be evaluated on the tuple itself. Finally, the process of querying and browsing over a multimedia repository is likely to be interactive, and users will tend to ask for only a few best matches according to a ranking criterion.

Many database systems have been built and prototyped with varying degrees of support for processing user-defined functions. The QBIC system from IBM Almaden, for example, allows users to query image repositories using a variety of attributes of the images, like color, texture, and shapes. The answer to a query is a rank of the images that best match the query values for the attributes. The features of this system are more fully explained in *Storage and Retrieval for Image and Video Databases* (SPIE), pp. 173–187 (February 1993). The QBIC system does not address the cost-based optimization of multimedia queries.

Another example is Cypress, a picture retrieval system built using Postgres that allows a filter condition to be specified, and returns a set of objects as the answer to the filter condition. Thus, the Cypress model does not support ranking. The ranking of multimedia objects based on how well they match a ranking expression is a crucial part of our model. Each object in Cypress has an image, a set of features (e.g., color histogram), and associated text and other structured information. The querying interface supports user-defined functions and predicates including a set of pre-defined graded matches (e.g., a predicate "mostly yellow"). In other words, the search is somewhat boolean in that it is either true or false that certain objects match a certain predicate.

FIG. 1 shows a simplified version of the searchable organization of the Cypress database containing ten pictures which have been classified according to category, location taken, color and photo caption. A set of indices are established for each of these attributes: whether the photo is classified within the State Water Project category; whether the photo is classified as being taken in Northern or Southern California; whether the picture color is classified as mostly blue, green or red; and an index containing the textual photo captions of each picture.

If a user of the Cypress system wishes to obtain pictures which are primarily of bodies of water, one would probably select "mostly blue" for the color attribute to obtain objects O4, O6, O7 and O9. If the user wishes to further limit the search to those pictures from Southern California locations, the user would obtain objects O4, O6 and O9. Limiting the search further to State Water Project areas would yield objects O4 and O9. Finally, the user may only wish a reservoir picture instead of an aqueduct. Typing the word "reservoir" into the text search engine of the Cypress system with the other filter conditions of the search might retrieve only object O9 from the multimedia repository containing the photographs.

The problem of optimizing user-defined filter conditions such as those in Cypress has been addressed in the prior art. Work such as that detailed in *Predicate Migration: Optimizing Queries with Expensive Predicates, Proceedings of the ACM SIGMOD International Symposium on Management of Data,* Washington D. C. (May 1993) focuses on conjunctive selection conditions. Techniques to optimize arbitrary boolean selection conditions have been presented in *Optimizing Disjunctive Queries with Expensive Predicates,* Sigmod record., 23(2):336 (1994). However, all of the above work focuses on what will be refered to herein as "probing costs", which is the cost of evaluating a condition over a given object and does not consider the search costs, which is the cost of finding out which objects satisfy a given condition. In fact, past work in this area does not consider the case where the search cost as well as the probing cost need to be considered for optimization of arbitrarily complex filter conditions containing AND/OR conjunctive and disjunctive expressions.

On the other hand, the problem of determining an optimal set of conditions to use to extract the desired set of objects (i.e., the optimal set of conditions to search) arises naturally when optimizing single-table queries with multiple indexes. The problem of sequencing the order of accesses to subfiles of transposed files is also closely related. However, in the above contexts, the probing cost is either zero or is independent of the predicates. When the filter condition is restricted to being a conjunction, the optimization problem can be cast as a join-ordering problem. However, such a formulation fails to capture characteristics that are particular of selection queries. In summary, past work in this area does not consider the case where the search cost as well as the probing cost need to be considered for optimization of arbitrarily complex filter conditions containing ANDs and ORs.

The information retrieval community has extensively studied the problem of ranking documents according to their expected relevance for a given query. Given a query with a plurality of terms, a retrieval system typically retrieves the inverted lists associated with each of the terms and ranks the documents that appear in these lists. If users are not interested in the entire document ranks, but only in the top document matches, some techniques avoid accessing all of the lists associated with the terms.

Fagin's work, as outlined in *Combining Fuzzy Information from Multiple Systems. Technical Report RJ* 9980, IBM Almaden Research Center, September 1995, and in PODS'96, focuses on how to evaluate queries that ask for a few top matches for a ranking expression. In the proposed queries, the notions of true and false are replaced by graded matches, and boolean operators are reinterpreted to give the semantics of composition functions that take two grades of match and produce a composite grade (e.g., Min, Max). Under broad assumptions on the cost model, Fagin demonstrated the optimality of his algorithm for a class of composition functions.

Fagin's work, however, did not include filter conditions in his model. Accordingly, a need remains for a method for searching and retrieving multimedia objects from a repository which integrate both filter conditions and ranking expressions.

SUMMARY OF THE INVENTION

It is, therefore, an object of the invention to reduce the cost of searching and extracting objects from a multimedia database.

Another object of the invention is to enable a user to request and retrieve only a desired number of multimedia objects which best fit the searching criteria i.e., the desired conditions that the metadata objects should satisfy, as specified by the user.

The method for optimizing a search over a multimedia database, according to the invention, includes translating a user defined ranking expression into a new filter condition. Given a user specified number of multimedia objects from the data base which best fit the attributes defined by the user, one estimates a grade necessary to retrieve a sufficient number of objects to fulfill the request. These grades then define attribute subconditions in the new filter condition. Statistics are also compiled in a database which determine the costs to process various searches and probes over the attributes. This grade can be estimated over all attributes specified using a set of statistics stored about the indices. Depending upon how the condition to be used to rank the objects has been built (i.e., using the Min or the Max operators), the filter condition is processed as a conjuctive expression (AND) or a disjuctive expression (OR) to retrieve a sufficient number of objects and thereby minimizing the cost of the search.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a simplified diagram showing the organization of image/text objects in the prior art Cypress Project multimedia repository according to user selected attributes.

DETAILED DESCRIPTION

1. System Overview

Figure 2:
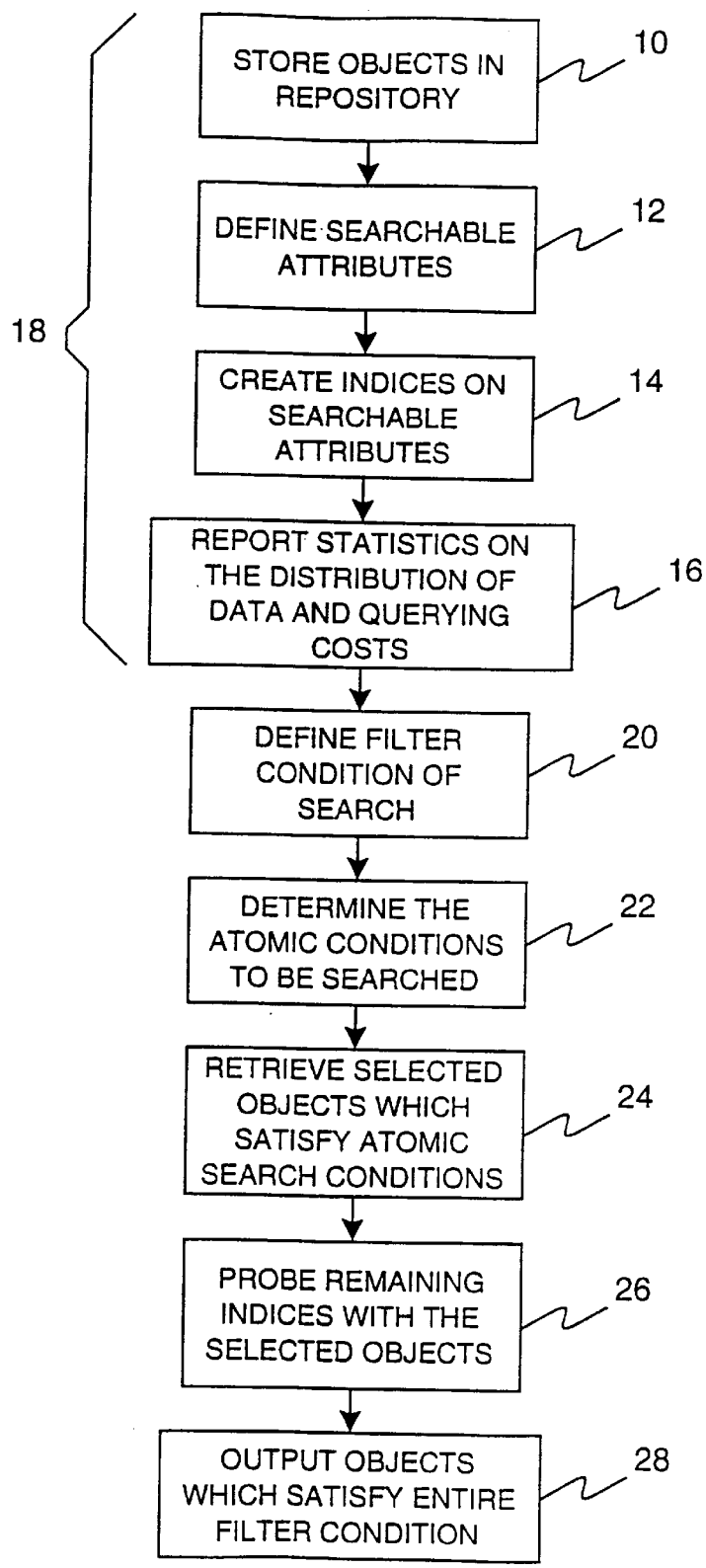
FIG. 2 is a flow diagram showing a method for optimally retrieving multimedia objects according to the present invention.

FIG. 2 illustrates the method for carrying out the invention. Multimedia objects are collected and stored in a multimedia repository in step 10. These multimedia objects are so defined because they can be defined by more than one searchable attributes such as color histogram, texture, sound files, as well as associated text. In preprocessing step 12, those object attributes which can be searched over can be defined. For instance, the Cypress project shown in FIG. 1 defined a color histogram attribute and subcategories or criteria (e.g., mostly red) and associated text with each of the images stored in the multimedia repository. In preprocessing step 14, indices are created on the searchable multimedia attributes defined in step 12 which characterize the objects. In step 16, statistics reflecting the distribution of data and associated querying costs over certain attributes are reported and collected for later retrieval during the searching and retrieving steps defined below. Alternately, statistics can be compiled on the data in order to estimate the grade of match necessary on each searchable attribute to retrieve a desired number of objects as more fully explained below with reference to FIG. 3. Steps 10,12,14 and 16 are preferably accomplished while the multimedia database is being compiled prior to any searching, as denoted by the bracket 18.

In searching step 20, a user would define a filter condition of the search which would identify and return a candidate set (or list) of the desired type of multimedia objects. For instance, Example 2.1 below illustrates the selection of objects having both attribute filter condition profile with a grade of 0.9 or higher and voice_sample with a grade of match of 0.5 or higher. The repository is then searched in steps 22,24 over the atomic conditions to be searched. As detailed further below in Section 3, a search minimal execution set (i.e., a set of atomic filter conditions used to retrieve multimedia objects that is both sufficient to get all the objects needed, and smallest among such sets) is determined (e.g. whether to search the repository over a particular individual or set of attribute filter conditions using "search" or to "probe" a retrieved subset of the repository). In the preferred embodiment, a statistical database is compiled using cost models for searches over different types of attributes and probe costs. Alternatively, estimation techniques can be used to estimate the expected cost to either search or probe the repository over the particular attribute. If the cost to search the repository is estimated or determined to be lower, then a search is run; otherwise, the multimedia repository is probed as in step 26. The objects which fulfill the entire filter condition are retrieved and sent back to the user's terminal (see FIG. 4) in step 28.

Figure 3:
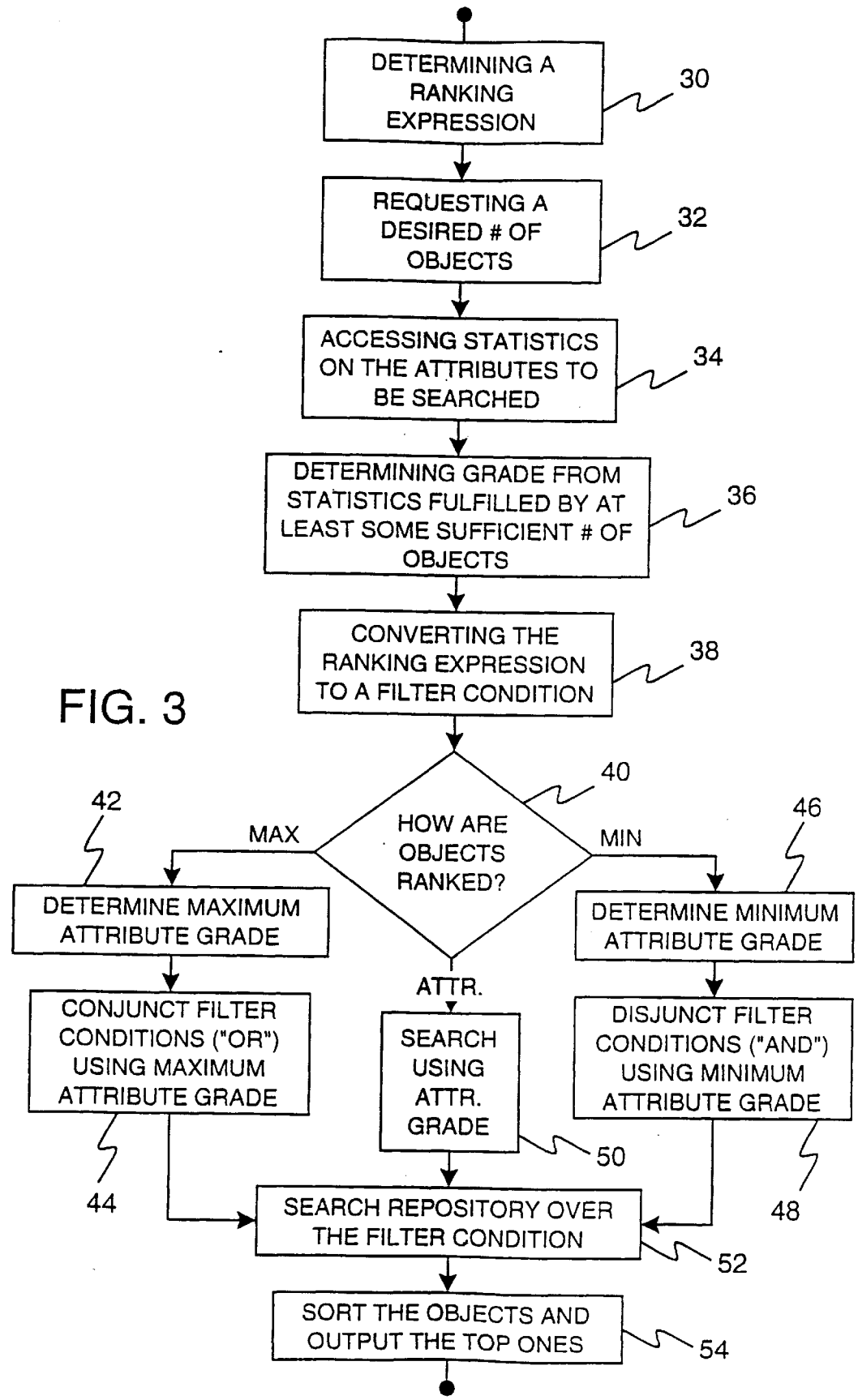
FIG. 3 is a flow diagram showing a method for selecting a filter condition according to a designated ranking expression.

Turning to FIG. 3, a user practicing the invention to retrieve a desired number of suitable objects from a multimedia database in ranked order of relevance to the searching conditions can first select a ranking expression, as in step 30.

As discussed further below with reference to Section 4, ranking expressions can be based on the Min or Max model (or some more complicated nested Max-Min expression) or simply by the grade of a designated attribute. In step 32, the user can designate a number which would return only a desired number of objects which best match the ranking expression (the "top objects"). In steps 34 and 36, the statistics precompiled in step 16 are accessed and a Grade is determined which is expected to be fulfilled by at least some sufficient number of top objects. A more complete explanation of this step is described in Section 4.3 below with reference to FIGS. 5 and 6. The determined ranking expression is then converted to a filter condition in step 38 according to how the ranking expression is defined (determination step 40). The repository is then searched over the filter condition (the converted ranking expression) in step 52. Finally, the returned objects are sorted based on their grade for the original ranking expression in step 54.

Figure 4:
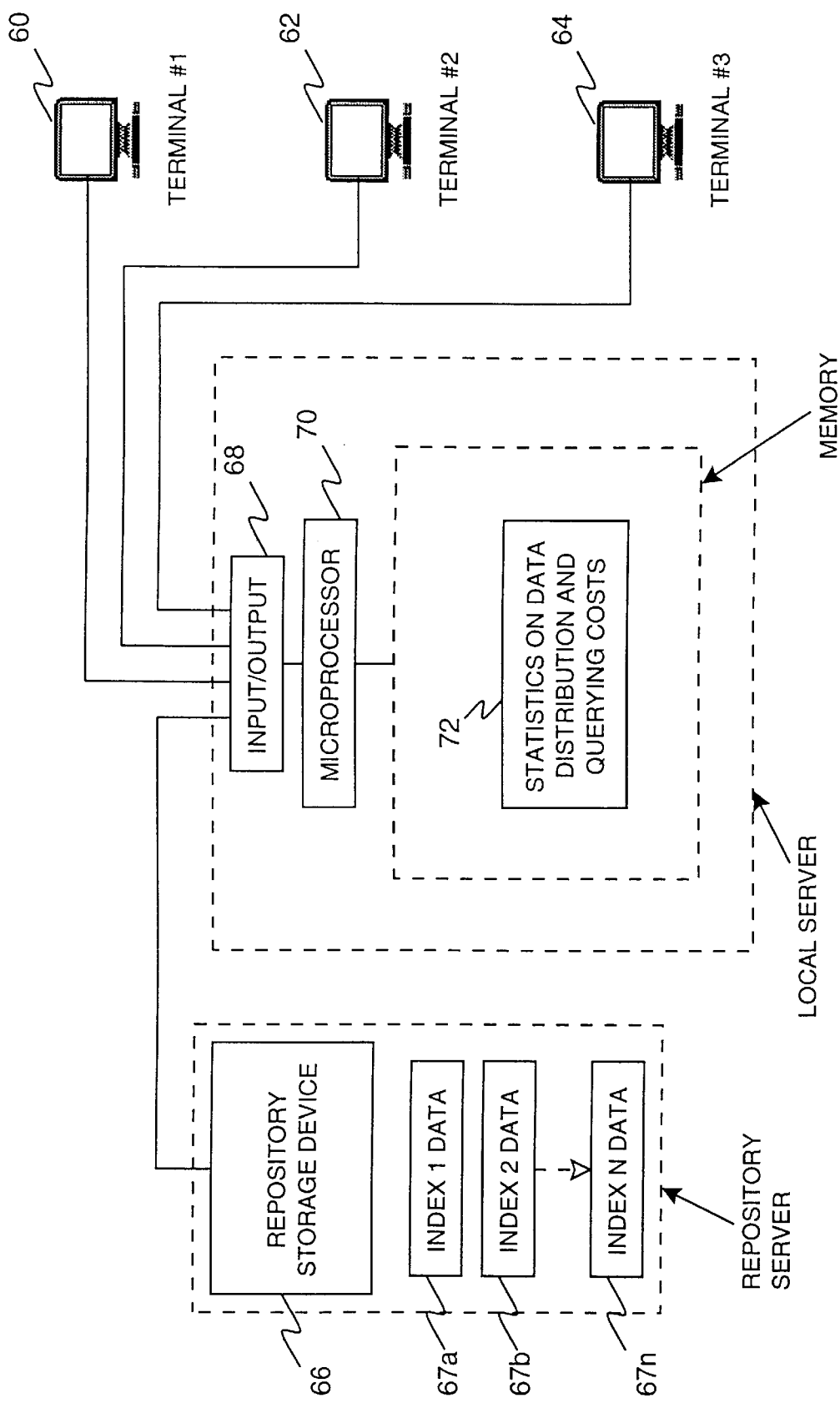
FIG. 4 is a schematic diagram representing a system for storing and optimally retrieving multimedia objects from a database.

FIG. 4 shows a system which carries out the method described above. A user initiates a search from input means, such as terminal 60. Other input means can also be connected to the system, such as terminals 62 and 64. The multimedia objects are stored in a repository such as in storage device 66. The objects may be stored over a distributed database wherein the objects are stored at a variety of locations. The terminals for requesting the search are connected to the repository via an interface, such as via a local file server which links the terminals with the repository over data or phone lines (not numbered). The file server includes an I/O port 68 and microprocessor 70 which can compile statistics 72 within a local memory on the data distribution and querying costs. For example, index 67-1 would contain data on a first attribute for each of the objects stored. Similarly, index 67-2 would contain data on a second attribute and so on to index 67-n. Alternately, each of the above elements of the system can be embodied in one desktop computer system. It should be noted, however, that the cost statistics 72 would be particular to each distributed and non-distributed system according to how the object data is arranged, managed and stored.

Conventionally, queries which specify both a filter condition (e.g., fingerprint compared to unknown print>90% match) and a ranking expression (e.g., top 20 suspects) can be executed by ranking the objects that satisfy the filter condition based on their grade of match for the ranking expression. It has been determined in simulation that the present invention, executed using the above steps, minimizes the "cost" to carry out the query; that is, it minimizes the burden on the database and search engine hardware, thereby enabling a more efficient retrieval of relevant information.

An atomic condition can be processed in two ways: by a "search", where all the objects that match the given condition are retrieved (access by value); and by a "probe", where instead of using the condition as an access method, the probe conditions are only tested against each retrieved object id (access by object id). For example, consider a filter condition consisting of a conjunction of two atomic conditions. By searching on the first condition and probing on the second, the latter benefits from the reduction in the number of objects that need probing due to the selectivity of the first condition.

The costs of these two kinds of accesses, search and probe, in multimedia repositories can vary for a single data and attribute type as well as across types. Furthermore, when the filter condition is a conjunction of atomic conditions, the problem becomes closely related to that of ordering joins. However, no work has yet studied the optimization problem when both searches and probes have non-zero costs and the filter condition is arbitrarily complex.

To optimize the processing of a filter condition when the conditions present in the filter condition are independent of one another, a space of search-minimal executions is defined whereby the search-minimal execution space is a restricted space. Nevertheless, it has been found that introducing a simple post-optimization step for conjunctive conditions yields plans that are nearly always as good as the plans obtained when plans are not restricted to be search minimal. Furthermore, experiments show that considering both the search and probe costs during query optimization impacts the choice of an execution plan significantly. Finally, if the conditions in the filter condition are not independent, the problem of determining an optimal search-minimal execution is NP-hard.

The present invention solves the problem of optimizing the evaluation of a ranking expression. Previous significant work in this area is due to Fagin's work. A key contribution of the present invention is to show that ranking expressions can be processed "almost" like filter conditions without any expected loss of efficiency. Indeed, it is shown here that the technique of the present invention is expected to retrieve no more objects than the strategy developed by Fagin. In fact, experimental results as explained in Section 5 below show that the performance gain from processing ranking expressions as filter conditions according to the present invention can reach over 30% in certain circumstances.

The following description explains the results obtained using a prototype retrieval system based on the present invention. The prototype contains a sample multimedia repository consisting of objects with images and textual captions. There, captions and images were obtained from the Digital Library project at the University of California at Berkeley, more specifically, from the Cypress project there.

The rest of the specification is organized as follows. Section 2 describes the query model utilized in a preferred embodiment of the invention. Sections 3 and 4 present the results of evaluating filter conditions and ranking expressions, respectively. Finally, Section 5 discusses the performance gain realized using the prototype implementation of the invention.

2. Query Model

In this section, a query model is introduced to select multimedia objects from a repository. A query identifies a candidate set (or list) of objects for displaying. The query model implemented according to the present invention satisfies the following requirements:

1. The query model must consider that a match between the value of an attribute of a multimedia object and a given constant is not exact, i.e., must account for the grade of match.
2. The query model must allow users to specify thresholds on the grade of match of the acceptable objects.
3. The query model must enable users to ask for only a few top-matching objects. Given an object, an attribute, and a constant value, the notion of a "grade of match" between the object and the given value for an attribute addresses the first requirement. Preferably, the grade is defined as a real number in the [0,1] range and designates the degree of equality (match) between the object attribute and the constant value. For instance, the color attribute of a stored image may be classified as red with a grade of match of 0.4. One method of determining this grade can be to analyze each pixel of the image and assigning a red grade to the image depending upon, for instance, the percentage of pixels which fall within a certain range of color. A 0.4 grade for color attribute red would then mean that 40% of the pixels in the stored image are of a generally red (or red/orange) color.

The second requirement of the query model constructed according to the present invention is fulfilled by allowing a user to designate a "filter condition". A filter condition is a set of requirements defined during the search which an object must fulfill in order to be selected. For instance, a filter condition to find a picture having a field of yellow and red flowers may have the filter conditions specified as color-yellow$\geq$0.3, color-red$\geq$0.4, and text-"flower"$\geq$1.0 where the text is an exact match for the filter condition. This filter condition has three subconditions or atomic filter conditions. An object satisfies these subconditions if the grade of match for the particular attributes is at least the grade values specified (e.g., color-yellow$\geq$0.3, color-red$\geq$0.4, and text-"flower"$\geq$1.0). Additional filter conditions are generated from the atomic conditions by using the AND and OR boolean connectives (evaluated as either true or false) in the method described further below.

The third requirement of the query model constructed according to the present invention is fulfilled by allowing a user to designate a "ranking expression". The ranking expression computes a composite grade for an object from individual grades of match and the composition functions Min and Max Every object has a grade between 0 and 1 for a given ranking expression. Users can then use a ranking expression in their queries, and ask for a specified number of objects with the top grades for the given ranking expression. These objects are known as "top objects" where ties can be broken arbitrarily. Alternatively, the query can be structured such that all objects with the same grade are returned, even if that exceeds the specified number of top objects requested.

The queries constructed according to the present invention can be expressed using the following SQL-like syntax.

| | |
|---|---|
| SELECT | oid |
| FROM | Repository |
| WHERE | Filter condition |
| ORDER | [k] by Ranking_expression |

The above query asks for k objects in the object Repository with the highest grade for the Ranking_expression, among those objects that satisfy the Filter condition. Intuitively, the filter condition eliminates unacceptable matches, while the ranking expression orders the acceptable objects.

Example 2.1

Consider a multimedia repository of information on criminals. A record on every person on file consists of a textual description (profile), a scanned fingerprint (fingerprint), and a recording of a voice sample (voice_sample). Given a fingerprint F1 and a voice sample V1, the following example asks for records whose fingerprint matches F1 well. Alternatively, a record is also acceptable if its profile matches the string "on parole" with grade 0.9 or higher (which might designate that the words appear a certain number of times), and its voice sample matches V1 with grade 0.5 or higher. The ranking expression (Max) ranks the acceptable records by the maximum of their grade of match for the voice sample V1 and for the fingerprint F1. The answer contains the top 10 such acceptable records.

| | |
|---|---|
| SELECT | oid |
| FROM | repository |
| WHERE | (Grade(voice_sample, V1) >= .5 AND Grade(profile, "on parole") >= .9) |
| OR | |
| | Grade(fingerprint, F1) >= .9 |
| ORDER | [10]BY Max(Grade(fingerprint, F1), Grade(voice_sample, V1)) |

An alternate ranking expression Min(Grade(fingerprint, F1), Grade(voice_sample, V1)) would rank the acceptable records by the minimum of their grade of match for the voice sample V1 and for the fingerprint F1. Additionally, other methods for ranking the acceptable records can be by the value of each of the subconditions, e.g., by the grade of match for the fingerprint, voice sample, or profile. For simplicity, the parameter oid was omitted in the atomic conditions above.

2.1 Storage Level Interfaces

A repository contains a set of multimedia objects. Each object has an identification (id) and a set of attribute values, which can be accessed through indexes, such as indexes 67a and 67b in FIG. 4. Given a value for an attribute, an index supports access to the ids of the objects that match that value closely enough, as described below. The indexes should also support access to the attribute values of an object given its object identification (oid).

The following are several storage-level access interfaces supported by conventional multimedia repositories. Key to these interfaces is that the objects match attribute values with a grade of match, as described above.

"GradeSearch": Given a value for an attribute, and a minimum grade requirement, returns the set of objects that match the attribute value with at least the specified grade, together with the grades for the objects.

"TopSearch": Given a value for an attribute, and the count of the number of objects desired, returns the desired number of top objects that match the attribute value with the highest grades in the repository, together with the grades for the objects.

"Probe": Given a set of object ids and a value for an attribute, returns the grade of each of the specified objects for the attribute value.

Note that not all repositories have to support all of these interfaces at the physical level. For example, a repository may implement Probe atop GradeSearch.

Example Attributes

Several methods are described below which can support the above interfaces in handling various types of attributes.

For textual attributes, the repository might have an index that handles queries using a vector-space model of document retrieval known in the prior art. In this context, the value of an object for the textual attribute is regarded as a traditional document. Then, given a query value for the textual attribute (i.e., a sequence of words), the index includes a grade to every object in the repository, according to how similar its value for the textual attribute and the query value are. To compute these similarities, vector-space systems typically represent both documents and queries as weight vectors, where each weight corresponds to a term in the vocabulary, and produce a document rank as the answer to the queries. The grade, or similarity, of a document and a query is usually computed by taking the inner product of their weight vectors. Conventional vector-space retrieval systems usually provide the GradeSearch interface, the TopSearch interface, or both.

Regarding the Probe interface, some prior art text-retrieval systems allow access to the document weight vectors by document id. If this is the case, the Probe interface is readily provided by accessing the weight vectors of the objects requested, and computing the similarity of these vectors and the query vector. If this direct access is not provided, Probe can be simulated by GradeSearch or TopSearch by requesting all objects with non-zero similarity, for example.

Other popular attributes are features of images. If an object of a repository contains an image, an attribute of the object could be the color histogram of that image. Then, a filter condition query on such an attribute can ask for objects whose image histogram matches a given color histogram closely, for example. One conventional method of handling such attributes and queries is by using R trees and its variants to index the feature vectors associated with the attributes. The grade between two feature vectors is computed based on the semantics of the attributes using sophisticated algorithms which are already known in the art.

Given one feature-vector attribute, a value for the attribute, and a grade, GradeSearch can be implemented over an R tree by determining the box around the given value that contains all vectors that match the value with the given grade or higher, for a given grade-computation method. TopSearch can then be implemented by processing the corresponding range search.

3. Filter Conditions

The following section describes the application of the methods of the present invention to the processing and cost-based optimization of queries having only a filter condition, i.e., the queries are of the form:

SELECT oid
FROM Repository
WHERE Filter_condition

For illustrative purposes, assume that the repository requires the use of an index to evaluate every atomic filter condition. One way to process such queries is to retrieve object ids using one GradeSearch for each atomic condition in the filter condition, and then merge these sets of object ids through a sequence of unions and intersections. An alternative is to retrieve a set of object ids using GradeSearch for some conditions, and check the remaining conditions on these objects through probe operations.

The key optimization problem is to determine the set of filter conditions that are to be evaluated using GradeSearch. The rest of the conditions will be evaluated by using Probe. In order to efficiently execute the latter step, the present invention exploits the known techniques in optimizing the probing of expensive filter conditions as in *Predicate Migration: Optimizing Queries with Expensive Predicates, Proceedings of the ACM SIGMOD International Symposium on Management of Data,* Washington D.C. (May 1993).

The first step of optimizing queries having only filter conditions is to define a space of search-minimal executions, and sketch the cost model and the optimization criteria. The next step is to construct an optimization algorithm from these criteria taking into account the conditions for optimality. Finally, the execution plan produced by the algorithm can be improved through post-optimization. Considering both the search and probe costs leads to significantly better execution strategies, where post-optimized search-minimal executions behave almost as well as the best (not necessarily search-minimal) executions. However, it has been found that the general problem of determining an optimal search-minimal execution is NP-hard, i.e., that it is extremely unlikely that one could build efficient solutions for this general problem.

3.1 Execution Space

The following is a discussion of the possible space of execution for simple filter conditions, i.e., conditions that consist of a disjunction (OR) or a conjunction (AND) of atomic conditions. The possible space of execution can be generalized as described below for arbitrary filter conditions.

To process an atomic condition Grade of Match≧grade, the GradeSearch access method is used.

Consider now the case where the filter condition is a disjunction of atomic filter conditions 1 through n: $a_1$ OR . . . OR $a_n$, where $a_i$ is used as a shorthand for an atomic condition specifying an attribute, value, and grade. All objects that satisfy at least one of the subconditions satisfy the entire filter condition. Evaluation of an atomic condition $a_i$ requires the use of the GradeSearch access method associated with $a_i$. Thus, if the atomic conditions are independent (defined more precisely in Section 3.2 below), then use of a GradeSearch is needed for each atomic condition so as not to miss any object that satisfies the entire condition.

Consider now the case where the filter condition is a conjunction of atomic filter conditions $a_1$ AND . . . AND $a_n$. There are several execution alternatives. In particular, all the objects that satisfy the filter condition can be retrieved by using GradeSearch on any one of the atomic conditions $a_1$, . . . $a_n$. Subsequently, each retrieved object can be tested to verify that it satisfies all of the remaining subconditions. The cost of using one atomic condition for GradeSearch instead of another may lead to significant differences in the cost. Thus, the conjunction of atomic filter conditions can be processed by executing the following steps:

1. Search: Retrieve objects based on one subcondition (using GradeSearch).
2. Probe: Test that the retrieved objects satisfy the other subconditions (using Probe).

An important optimization step is to carry out Step (2) efficiently by determining an order for probing the atomic conditions. This step will be discussed further in Section 3.3.

The above class of execution alternatives for a conjunctive query is called "search-minimal" since only a minimal set of subconditions (in this case, only one subcondition) is used for GradeSearch. The search-minimal strategies represent a subset of the possible executions. In particular for a conjunctive filter condition, instead of searching on a single subcondition and probing on the others, it is possible to search on any subset of the atomic conditions and to take the intersection of the object-ids retrieved. However, the space of all such executions is significantly larger. In particular, there are exponentially many subsets of conjuncts to search on, but only a linear number of minimal conjunct sets for searching.

A search-minimal execution performed according to the present invention evaluates a minimal set of atomic conditions using GradeSearch, and evaluates the rest of the conditions using Probe. A simple conjunctive filter condition requires a GradeSearch over only one atomic condition. However, an arbitrary filter condition involving AND's and OR's might need to search more than one atomic conditions, like the disjunction above.

Several advantages are achieved by focusing on search-minimal executions. First, as is discussed in the context of conjunctive queries, search-minimal executions avoid an explosion in the search space. Next, as discussed in Section 3.4 and demonstrated experimentally in Section 5, simple post-optimizations enable derivation of a cheaper execution that is not necessarily search-minimal from the optimal search-minimal execution.

A set of objects are obtained when searching on a subcondition using GradeSearch. In certain situations, the invention does additional probing to determine the subset of objects that satisfy the entire filter condition. Thus, given an atomic condition and a filter condition, the "residue" is the condition that the objects retrieved through the subcondition should pass to satisfy the entire filter condition. The following definition shows how residues are constructed using a tree representation of the filter conditions.

Definition 3.1

Let f be a filter condition, represented as a tree, and a an atomic condition of f. Consider the path from the leaf node for a to the root of the tree for f. For every ∩ node i in this path, let $a_i$ be the condition consisting of the conjunction of all the subtrees that are children of the node i and that do not contain a. Then the residue of f for a, R(a,f), is $\cap_i a_i$.

Example 3.2

Consider the filter condition:

$$f = a_4 \cap ((a_1 \cap a_2) \cup a_3)$$

Using the above definition of residue as applied to the atomic condition $a_2$, $a_1 = a$, and $a_2 = a_4$. Hence, $R(a_2, f) = a_1 \cap a_4$. If $a_4$ is chosen as the search condition, then $R(a_4, f) = ((a_1 \cap a_2) \cup a_3)$. Then, any object that satisfies $a_4$ and also satisfies $R(a_4, f)$ satisfies the entire filter condition.

Given a filter condition f the optimization method practiced according to the present invention characterizes the smallest sets of atomic conditions such that by searching these conditions, all of the objects that satisfy f are retrieved (plus some extra ones that are pruned out by probing).

Definition 3.3

A complete set of atomic conditions $m_f$ for a filter condition f is a subset of the atomic conditions in f such that any object that satisfies f also satisfies at least one of the atomic conditions in $m_f$. A complete set $m_f$ for f is a search-minimal condition set if there is no proper subset $m_f'$ of $m_f$ that is also complete.

Once the complete condition set $m_f$ is identified, the following equality holds:

$$f = \bigvee_{a \in m_f} (a \cap R(a, f))$$

where R(a,f) is the residue of f for a. In particular, the above holds if $m_f$ is a search minimal condition set.

Example 3.4

Consider Example 3.2. Each of $\{a_4\}$, $\{a_2, a_3\}$, and $\{a_1, a_3\}$ is a search-minimal condition set. If one decide to search on $\{a_2, a_3\}$, the following two steps yield all of the objects that satisfy f:

1. Search on $a_2$ and probe the retrieved objects with residue $R(a_2, f) = a_1 \cap a_4$.
2. Search on $a_3$ and probe the retrieved objects with residue $a_4$.

Next, the space of search-minimal executions is defined using the following method.

Definition 3.5

A search-minimal execution of a filter condition performed according to the present invention searches the repository using a search-minimal condition set A, and executes the following steps:

For each condition a∈A:
  Search on a to obtain a set of objects $S_a$
  Probe every object in $S_a$ with the residual condition R(a, f) to obtain a filtered set $S_a'$ of objects that satisfy f Take the union $\bigcup_{a \in A} S_a'$ Algorithms constructed according to the present invention and described below pick a plan from the space of search-minimal executions. The search strategies can be further optimized in a post-optimization step to lower their cost according to the methods discussed further below in Section 3.4. The strategies that result from these post-optimizations will, generally, not be search-minimal executions anymore.

3.2 The Cost Model

The optimization algorithm described below is cost-based using known or assumed relationships among the conditions in the query as well as certain available or assumed available statistical parameters.

Statistical Parameters

Each atomic condition a has associated therewith the following statistics which are extracted from the underlying object repository and its indexes:

"Selectivity Factor" Sel (a): Fraction of the objects in the repository that satisfy the condition.

"Search Cost" SC(a): Cost of retrieving all the objects that satisfy the condition using GradeSearch.

"Probe Cost" PC(a),p): Cost of checking the condition for the number of probed objects, using the Probe access method.

The probe cost depends on the number of probes that need to be performed. If the number is large enough, the probe cost can be larger than the search cost and it might be cheaper to implement the probes by doing a single search on the condition. This observation is used by the post-optimization step of Section 3.4.

Estimating Parameters over Repositories

Consider first a textual attribute that is handled by a vector-space retrieval system. Typically such a system has inverted lists associated with each term in the vocabulary. Two numbers can be extracted from each list: the number of documents that contain the corresponding term, and the added weight of the term in the documents that contain it. Using these extracted numbers, the selectivity of an atomic filter condition, as well as the cost of processing the inverted lists can be easily estimated.

Consider now an attribute over an image that is handled with an R tree. Fractal dimensions of a data set can be used to estimate the selectivity of atomic conditions, and the expected cost of processing such conditions using the R tree. (See Section 5.)

Assumptions on Conditions

The optimization for only a particular class of filter conditions is described below, although other class optimizations are possible using the teachings of the invention. Similar restrictions have been traditionally adopted since the System-R optimization effort.

Definition 3.6

A filter condition f is "independent" if:

1. Every atomic filter condition occurs at most once in f
2. Every n atomic filter conditions $e_1, \ldots, e_n$ satisfy the following constraint:

$$p(e_1 \wedge \ldots \wedge) = \prod_{i=1}^{n} p(e_i)$$

where p(e) is the probability that the filter condition e is true.

When the filter condition is independent, the selectivities of complex filter conditions can be computed using the following two rules as in traditional optimization:

$Sel(e_1 \cap \ldots \cap e_n) = \Pi_{i=1} Sel(e_i)$ $Sel(e_1 \vee \ldots \vee e_n) = 1 - \Pi_{i=1}(1 - Sel(e_i))$

3.3 Optimization Algorithm

The present invention optimizes filter conditions according to the following steps which are further described below. First, an optimization metric is defined over the search-minimal execution space. Next, a strategy for probing is determined using the past work in optimizing boolean expressions. Though the invention is optimal for independent filter conditions, it can be adapted for non-independent filter conditions using the methods described below. It is shown that if the filter condition is not independent, then the complexity of determining an optimal execution is NP-hard.

Cost of the Search Minimal Executions

The following definition for the cost of search-minimal executions enables a user to pick the least expensive search-minimal execution. The cost of one such execution depends on (a) the choice of the search conditions, (b) the probing costs of the remaining conditions, and (c) the cost of taking the union of the answer sets. The cost of (c) dominates only when the selectivity of the filter condition is low. Therefore, to simplify the optimization problem, the method for cost-based optimizing practiced according to the invention focuses only on the search and probe costs.

Given a search-minimal condition set m for a filter condition f, the cost of searching the conditions in m plus the cost of probing the other conditions can be computed as follows:

$$C(f, m) = \sum_{a \in m} (SC(a) + PC(R(a,f), |Oa|))$$

where $|O_a|$ is the number of objects that satisfy condition a. Thus, if there are O objects in the repository, $|O_a|=Sel(a)*O$. Note that crucial to the above cost estimation is the ability to compute the probing cost $PC(R(a, f),|O_a|))$. The estimation of such a cost depends on the strategy used to evaluate $R(a, f)$.

Optimizing Evaluation of Residues

Given a residue $R(a, f)$, the task of determining an optimal evaluation for $R(a, f)$ maps to the well studied problem of optimizing the execution of selection conditions containing expensive predicates.

If $R(a, f)$ is a conjunction of atomic conditions $a_1$ AND ... AND $a_j$, the $a_i$'s should be sorted out according to the inventive method described in order to minimize the cost of probing the conjunction. The atomic conditions can then be ordered in increasing rank, where the rank of the condition $a_i$ is $(Sel(a_i)-1)/c_i$ assuming that $PC(a_i, n)=c_i*n$ for some constant $c_i$. Then, given n, the cost $PC(R(a, f), n)$ can be estimated as follows, where $a_1, \ldots a_l$ represents the increasing rank ordering of the conjuncts.

$$PC(R(a,f), n) = \sum_{i=1}^{l} S_j$$

Here, $S_j=s_1* \ldots *s_{j-1}*n*c_j$, where $s_i$ is the selectivity of $a_i$. A similar approach can be taken to order the evaluation of a disjunction of atomic conditions.

Example 3.7

Consider the filter condition $a_1 \cap a_2 \cap a_3$, where $Sel(a_1)=0.01$, $Sel(a_2)=0.02$, and $Sel(a_3)=0.05$. Let $c_1=c_2=1$, and $c_3=0.5$. The increasing rank sequence is then $c_3,c_1,c_2$. Then, the probing cost for 1000 objects is as follows:

$(0.5+0.05*1+0.05*0.01*1)*1000=550.5$

In case $R(a, f)$ is an arbitrary boolean condition, the problem of evaluating it optimally is known to be intractable. However, several good heuristics are available in the prior art. Therefore, one of these available techniques can be exploited in the invention to optimize the evaluation of residues, and hence to estimate $C(f, m)$. Indeed, depending on the strategy w used to evaluate $R(a, f)$, the cost function can be parameterized and denoted by $C_w(f, m)$.

Optimality

Given that the cost metric $C(f, m)$ can be computed for any choice of m, our goal will be to pick an optimal search-minimal condition set:

Definition 3.8

Let M be the set of all search-minimal condition sets for a filter condition f. A search-minimal condition set m is optimal if and only if $C(f, m)=\min_{i \in M} C(f, i)$.

The preferred method for determining the optimal search-minimal condition set for an independent filter condition is described below. The algorithm is implicit in the following inductive definition, where the algorithm traverses the condition tree in a bottom-up fashion to create the optimal set of search-minimal conditions.

Definition 3.9

Let f be a filter condition. The "inductive" search-minimal condition set for f, bm(f), is defined inductively for a subcondition f' as follows:

1. Case f'=a: bm(f')={a}, where a is an atomic condition
2. Case f'=$f_1 \cap \ldots \cap f_n$: bm(f')=bm($f_i$), where C(f, bm($f_i$))=min{C(f, bm($f_1$)), ..., C(f, bm($f_n$))}
3. Case f'=$f_1 \vee \ldots \vee f_n$: bm(f')=bm($f_1$)$\cup \ldots \cup$bm($f_n$)

Proposition 3.10

Let f be an independent filter condition. Then bm(f) is an optimal search-minimal condition set.

Proof

The filter expression f can be viewed as an expression tree since f is independent, and thus contains no repeated atomic conditions. The proof is by induction on the height of the tree, and uses the fact that since f is independent, if $f_1$ and $f_2$ are children of an OR or an AND node, the optimal search-minimal condition set may be created from the search-minimal condition sets for $f_1$ and $f_2$.

The proof of optimality of bm(f) depends on the fact that the given filter condition is independent. Nonetheless, with the following simple modification, the above method still provides a search-minimal condition set in case the given condition is not independent. However, this set is no longer guaranteed to be optimal:

1. Derive bm(f) assuming f is an independent condition.
2. Identify a subset f'⊆ bm(f) that is minimal. (f' included in bm(f))

Observe that the first step ensures completeness whereas the second step ensures that the set f' is minimal and can be determined efficiently. However, as the following example shows, such a heuristic does not result in an optimal search-minimal condition set.

Example 3.11

Let us assume that the filter condition is (a AND b) OR (a AND c). The first step of the algorithm treats every instance of a as a different condition. So, the query is viewed by Step (1) as ($a_1$ AND b) OR ($a_2$ AND c). Assume that the method determines bm(f)={b,c}. Step (2) of the method does not change bm(f), although {a} could be a significantly better search-minimal condition set. Therefore, the above method may fail to identify the best search-minimal condition set if the subconditions are not independent, as in this example.

The above result is not surprising given the fact that the general optimality problem is intractable, as the following theorem shows.

Theorem 3.12

The problem of determining an optimal search-minimal condition set for a filter condition is NP-hard.

Proof

The result can be proved by a reduction from the vertex-cover problem. To map an instance of the vertex-cover problem G to our problem, a filter condition F is generated such that G has a vertex cover of size k or less if and only if there is a processing strategy for F that retrieves objects using searches over k or fewer atomic conditions. A unit cost is associated for every search, and zero cost for the probes to complete the proof.

3.4 Post-optimization: Beyond Picking a Search-Minimal Set

While choosing an optimal search-minimal condition set is a key step in selecting an efficient execution plan, there are several other opportunities for optimization.

First, a search-minimal execution for a filter condition according to the invention always handles the residue of a search subcondition by probing. However, when the number of objects to be probed is high, the cost of probing may exceed the cost of searching on the atomic condition via GradeSearch. Thus, in case of a conjunctive query, it might be more efficient by selecting more than one condition for searching. In other words, it could be convenient to allow the conditions that are used for searching to no longer form a search-minimal condition set. However, the present optimization method does not consider such a plan. In one embodiment of the invention, a post-optimization step locally replaces probes on one or more conditions by the corresponding searches, as described by the strategy below.

Example 3.13

Assume that the optimal search-minimal execution of $a_1$ AND $a_2$ AND $a_3$ searches on condition $a_1$, and probes on conditions $a_2$ and $a_3$. Let the number of objects probed by $a_2$ be 1000, and the probe cost be 1 unit for every probe. Thus, the total cost of probing on $a_2$ is 1000 units. If the search cost on $a_2$ is 800, then the execution plan can be modified a posteriori to search on conditions $a_1$ and $a_2$, and to probe just on $a_3$.

Next, the step of merging the result sets from different atomic conditions also presents opportunities for optimization: (1) An object that is retrieved by searches on both $a_1$ and $a_2$, can be probed using either the residue $R(a_1, f)$ or the residue $R(a_2, f)$. Such a choice can be cost-based and influences the order of merging results from multiple searches. (2) The merging order is also influenced by the cost of detecting and eliminating duplicate objects, and the size of the answer sets resulting from searches.

4. Filter Conditions and Ranking Expressions

This section describes the application of the present invention to queries that consist not only of a filter condition, but also of a ranking expression. The answer to such queries consists of the top objects for the ranking expression that also satisfy the filter condition. The method for constructing queries consisting just of ranking expressions is described in Section 4.1. Section 4.2 describes a prior art method for processing these types of queries.

Finally, Section 4.3 describes a novel way for applying the above method according to the present invention and presents the main result regarding these queries.

As described in further detail below, the ranking expression can be mapped into a filter condition and processed approximately as if were a filter condition, with no expected performance loss. Using this result, queries with ranking expressions can be processed applying the methodology described above in Section 3 for processing filter conditions. The experimental results of Section 5 support this result by showing that the number of objects retrieved when processing a ranking expression as a filter condition can be considerably smaller than when processing the ranking expression using the methods found in the prior art.

4.1 Ranking Expressions

A query consisting of just a ranking expression has the form:

---
SELECT oid
FROM Repository
ORDER [k] by Ranking_expression

---

The result of this query is a list of k objects in the repository with the highest grade for the given ranking expression. The ranking expressions are built from atomic expressions that are combined using the Min and Max operators defined in Section 2, as in the example below.

Example 4.1

Let us consider the ranking expression $e_1$=Max(Grade (fingerprint, f), Grade(profile, p)). Expression $e_1$ favors objects with either fingerprints matching the given value f closely, or with text profiles matching the given profile p closely.

Alternatively, consider the ranking expression $e_2$=Min (Grade(fingerprint, f), Grade(profile, p)). Expression $e_2$ favors objects with good matches for both their fingerprints and profiles.

4.2 Prior Art Method for Processing Ranking Expressions—Fagin's Strategy

Recently, a new approach to processing a query consisting of a ranking expression was presented in *Combining Fuzzy Information from Multiple Systems. Technical Report RJ 9980*, IBM Almaden Research Center, September 1995, and in *PODS'96* (hereinafter "Fagin").

Fagin considers a ranking expression which is dependent upon the minimum grade of match (Min) between a plurality of independent atomic expressions. If a particular number of top objects with the highest grades for the ranking expression are desired, Fagin's algorithm uses the TopSearch access method to retrieve these objects from the repository. The algorithm works by retrieving a set of top objects-from each of the subconditions, until the intersection of all those sets has at least the desired number of top objects. Fagin proved that the set of objects that he retrieved contains the desired top objects. Therefore, the final grade for the ranking expression of each of the objects retrieved can be computed, doing the necessary probes, and output the desired number of top objects with the highest grades.

Fagin has proved the important result that the method described above for Min expressions is asymptotically optimal with arbitrarily high probability for retrieving the is desired number of top objects.

Fagin also considered a ranking expression dependent upon the maximum grade of match (Max) between a plurality of independent atomic expressions. If a particular number of top objects with the highest grades for the ranking expression are desired, Fagin's method requests exactly the desired number of top objects from each of the subconditions. From these subcondition top objects are culled the desired number of top objects for the entire plurality of subconditions.

4.3 Processing Ranking Expressions as Filter Conditions

Ranking expressions can be processed as modified filter conditions by considering the space of search-minimal executions for filter conditions, without any expected loss of efficiency, thus providing an elegant and uniform treatment of ranking expressions and filter conditions.

In the novel method described below, a ranking expression is specified to get a sorted set of objects. Filter conditions have flat sets as their answers. In the strategy described below, after processing a ranking expression as a filter condition, the grade of the retrieved objects for the ranking expression is computed and the retrieved objects sorted before returning them as the answer to the query.

The present invention operates on the following proposed principles given a ranking expression and the number of objects desired:

1. There exists a method to assign a grade for each atomic expression in the ranking expression, and a filter condition with the same "structure" as the ranking expression such that the filter condition retrieves at least a desired number of top objects.
2. There is a search-minimal execution for the filter condition that retrieves a sufficient number of objects that is no larger than the expected number of objects that Fagin's method would retrieve.

Example 4.2

Consider a Min-based ranking expression:

$$\text{Ranking Expression} = \text{Min}(\text{Grade}(a_1,v_1), \text{Grade}(a_2,v_2))$$

where $a_i$ is an attribute, and $v_i$ is a constant value, i=1, 2, and two objects with the top grades for the ranking expression are desired. The invention, working on the above proposed principles, determines a grade such that there are at least two objects with that grade or higher for the ranking expression. Therefore, if all of the objects with that grade or higher for the ranking expression are retrieved, the retrieved objects can be ordered according to their grades, and the top two returned as the result to the query.

In other words, the ranking expression can be processed by converting into the following associated filter condition, followed by a sorting step of the answer set:

$$\text{Filter Condition} = (\text{Grade}(a_1, v_1) \geq G) \text{ AND } (\text{Grade}(a_2, v_2)(o) \geq G)$$

By processing the above filter condition using the strategies of the present invention described in Section 3, all of the objects with grade G or higher for $a_1$ and $v_1$, and for $a_2$ and $v_2$ can be obtained. Therefore, all of the objects with grade G or higher for the ranking expression are obtained. The number of retrieved objects in this set (i.e., two objects in the above example) should be sufficient to answer the query with the Min-based ranking expression if G has been properly estimated using the techniques described below.

Max-based ranking expressions can take the form:

$$\text{Ranking Expression} = \text{Max}(\text{Grade}(a_1, v_1), \text{Grade}(a_2\ v_2))$$

where $a_i$ and $v_i$ are as before, i=1, 2, and where two objects with the top grades for the above ranking expression are desired. A grade is determined using statistics as with the processing of the Min-based ranking expression above such that there are at least two objects with that grade or higher. The ranking expression can then be processed by using the following filter expression:

$$\text{Filter Condition} = (\text{Grade}(a_1,v_1)(o) \geq G') \text{ OR } (\text{Grade}(a_2,v_2)(o) \geq G')$$

By processing the above filter condition, all of the objects having grade G' or higher for the Max-based ranking expression are retrieved. If there are at least two of such objects, then the ranking expression can be answered by returning two objects with the top grades for that ranking expression from among the set of objects that are retrieved.

The key point in the mapping of the problem from a ranking problem to a (modified) filtering problem lies in finding the grade G to use in the filter condition, as in the example.

Figure 5:
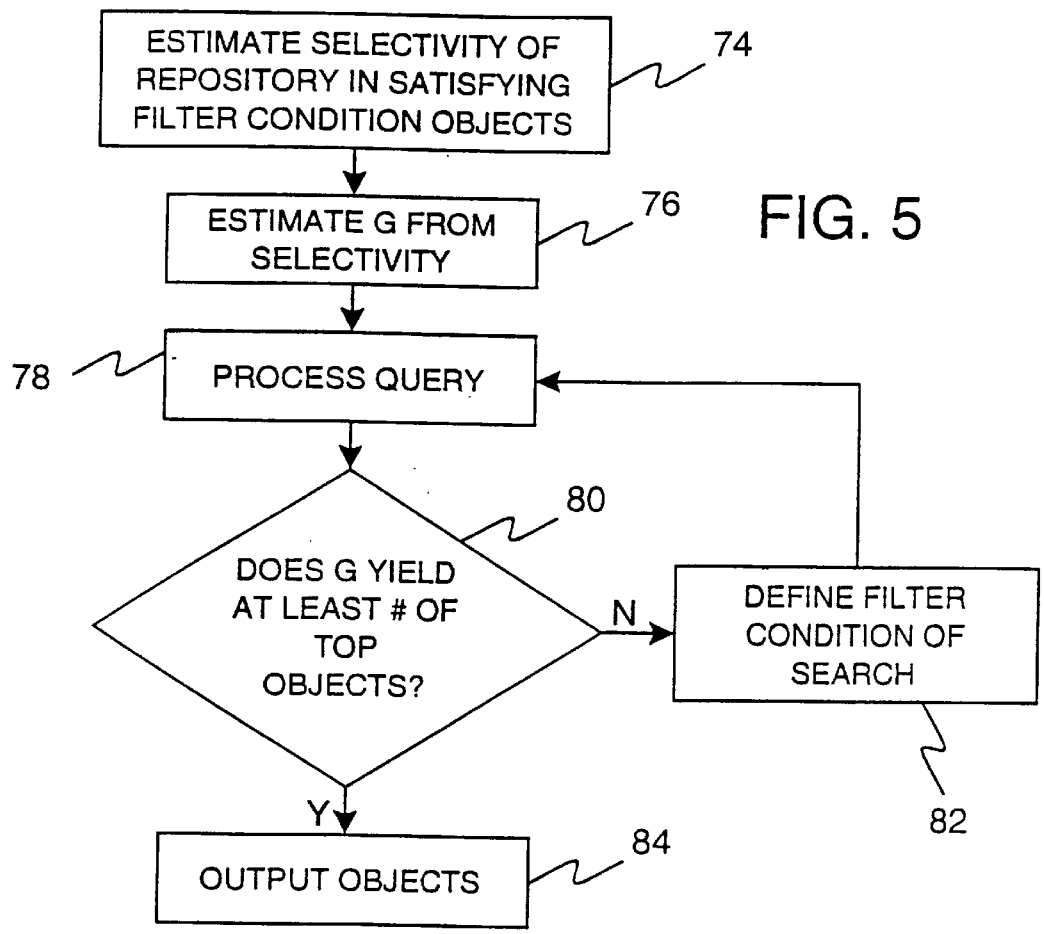
FIG. 5 is a flow diagram showing a preferred method for estimating a grade of match according to the invention.

The preferred method for estimating a grade G (or G') of the translated ranking expression for the filter condition is shown in FIG. 5. In steps 74 and 76, a grade (preferably the largest) is estimated from the estimated or known fraction of objects in the repository which might satisfy the filter condition (the "selectivity") so that the number of satisfactory objects is approximately equal to or greater than the desired number of top objects requested. For any such G, the expected number of objects retrieved using the filter condition will be at least the number desired when the query is processed in step 78. Since G might be determined using selectivity estimates that might not be completely accurate, fewer than the desired number of top objects might be retrieved in step 80 by using the translated ranking expression. In this case, the test grade needs to be lowered as in step 82 and the filter condition rerun against the repository (step 78 again) until at least the desired number of top objects are retrieved and outputted in step 84.

Figure 6:
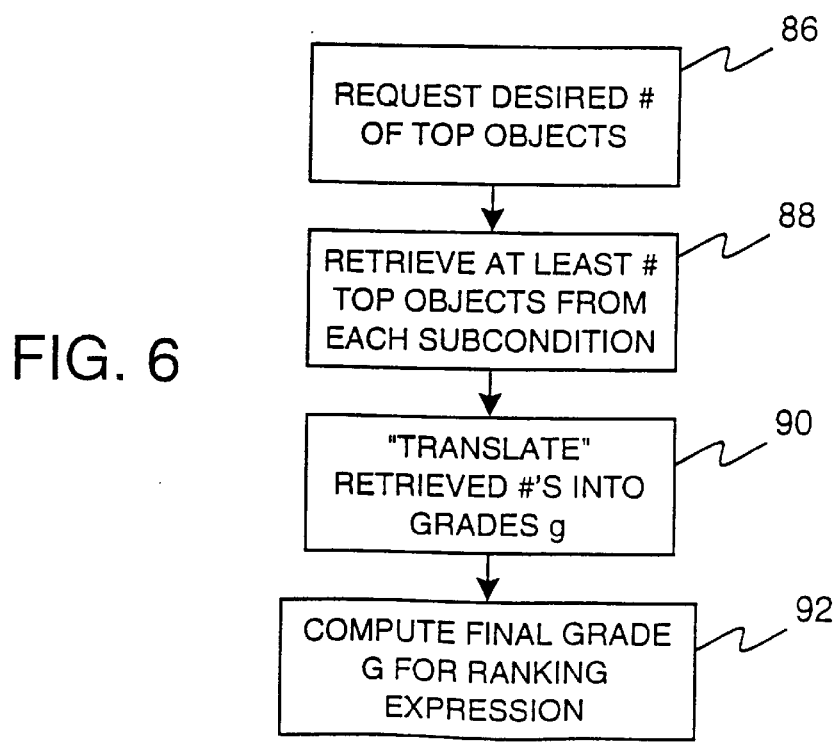
FIG. 6 is a flow diagram showing an alternate method for estimating a grade of match.

Another way to find a grade G is to use Fagin's algorithm for processing ranking expressions as shown in FIG. 6. (See Section 4.2.) Given the number of top objects desired and input in the system in step 86, the expected number of objects that his method will retrieve for each atomic expression can be determined in step 88. These expected numbers can then be "translated" into grades in step 90 such that the expected number of objects having at least the value of the translated grade for each atomic expression will yield at least the number of expected objects. Finally in step 92, all the grades can be combined to determine a total grade G for the filter condition.

The following describes an alternate novel method of the present invention (called "Grade_Rank") for determining grade G for the filter condition which utilizes the number of objects desired, a ranking expression, and selectivity statistics to process the ranking expression:

1. Propagate the number of objects requested down to each atomic expression. Assign to each atomic expression the number of objects that Fagin's algorithm is expected to retrieve using the atomic expression.
2. Translate each expected number to a respective grade using selectivity statistics: the expected number of objects thereby each having a grade equal to or greater than the respective grade for each atomic expression.
3. Propagate the respective grades from the atomic expressions up to the entire ranking expression. A Min-based filter condition having a plurality of sub-conditions gets the minimum of the grades assigned to its subconditions. A Max-based filter condition gets the maximum of the grades assigned to its subconditions.
4. Return the grade G assigned to the entire ranking expression.

Example 4.3

Consider the case where a ranking expression ranks retrieved objects according to the minimum grade of match value (which is generally between 0 and 1) between two attributes (a "Min-based ranking expression"). Suppose that the number of objects in the repository is one hundred. If only the top object is desired, the expected number of objects that Fagin's method will retrieve from searches over both attributes is ten. If it is estimated that at least ten objects will be received by choosing a grade of match for the first attribute of 0.2 and a grade of match over the second attribute of 0.3, then the Min ranking expression will yield a global grade of match G for the repository search of 0.2. This global grade value of G is then used in the filter condition derived from the translated ranking expression in Example 4.2:

Filter Condition=(Grade($a_1$,$v_1$)(o)≧0.2) AND (Grade($a_2$, $v_2$)(o)≧0.2)

Once the grades for the atomic expressions have been determined, a single global grade G can be determined and used in the filter condition for processing the ranking expression. The following example illustrates why a global grade G needs to be determined, instead of just using the atomic expression grades.

Example 4.3: (cont.)

Suppose that instead of the above filter condition, the following filter conditions (for "wrong") is used for processing the ranking expression:

$$f_W=(Grade(a_1,v_1)(o)≧0.2) \text{ AND } (Grade(a_2,v_2)(o)≧0.3)$$

Assume a repository containing two objects classified by at least two attributes. The first object has a grade of match for the first attribute of 0.2 and a grade of match for the second attribute of 0.3. The second object has grades of matches of 0.25 for each of the two attributes. The second object has a Min value of 0.25 (the minimum of the two grades of match) while the first object has a Min value of only 0.2. Therefore, the second object should be the top object retrieved in the search. However, filter conditions would not retrieve the second object because its grade of match for the second subcondition is not greater than or equal to 0.3. Therefore, the above filter condition is a wrong translation of is a Min-based ranking expression.

The following material shows that processing a ranking expression by using a filter condition with grade G as determined by the Grade_Rank method of the present invention will retrieve no more objects and thus is at least as efficient as Fagin's method.

Definition 4.4

A repository is "continuously graded" if for every atomic expression e and integer L there exists a grade g such that Sel(e,g)*O=L, where O is the number of objects in the repository.

Intuitively, a continuously graded repository does not have "ties": given an atomic expression e and a number L, there is a grade cut-off for the expression such that there are exactly L objects with such a grade or higher for e as the following theorem for continuously graded repositories shows.

Theorem 4.5

Let R be an independent ranking expression over a continuously graded repository with O objects, and k be the number of objects desired. Let F be the filter condition associated with R that uses the grade G computed by algorithm Grade_Rank for R and k. Then:

Sel(F)*O≧k (i.e., at least k object are expected to satisfy F), and

There is a search-minimal execution for F such that it expected to retrieve no more objects than the number retrieved using Fagin's strategy.

Example 4.3: (cont.)

Suppose that Sel($e_1$,0.2)=Sel($e_2$,0.3)=L/O=0.1. Then, Sel (f)≧0.1* 0.1=0.01. Then, the expected number of objects satisfying f is at least 0.01*O=1=k.

One search-minimal strategy to process f executed according to the present invention (see Section 3) searches on $e_1$ with grade, 0.2, retrieving an expected 10 objects. Fagin's strategy is expected to retrieve a total of 20 objects (10 per subexpression).

Observe that although a search-minimal execution can be constructed that accesses no more objects than Fagin's method, the strategies in Section 3 are chosen based on their costs, not on the number of objects that they retrieve. The optimality property of the present invention guarantees that the cost of the chosen execution is not higher than that of the execution that retrieves no more objects than Fagin's plan.

The main result of this section applies to continuously graded repositories. If a repository is not continuously graded, or if the statistics that are kept on the repository are not as finely grained as to allow for modeling the repository as continuously graded, then the methods of the present invention are not as efficient. However, Section 5 shows that the methods described in this section are still desirable one, even when the repositories queried are not continuously graded.

5. Experimental Results

The results of the previous section were tested using synthetically generated data described below, resulting in optimality improvements of up to 33%. The test database included 1,000,000 objects, each having five attributes. Out of these five attributes, $A_1$ and $A_2$ are text attributes handled by vector-space search engines. The remaining three attributes, $A_3$ through $A_5$, are defined over images, and handled by R-tree indexes. These attributes were used to build atomic expressions $e_1$=Grade($A_i$, $v_i$), for fixed values $v_i$, i=1, . . . , 5.

To run our experiments, values were defined for the selectivities and for the search and probe costs associated with each of the atomic expressions. Table 2 summarizes the base parameter values used, which were obtained from experiments performed using free WAIS 1.0, and from Surajit Chaudhuri, Umeshar Dayal, and Tak W. Yan. *Join queries with external text sources: execution and optimization techniques. In Proceedings of the 1995 ACM SIGMOD Conference,* May 1995.

Expressions $e_1$ and $e_2$: To compute the selectivities for $e_i$(i=1, 2) and the various grades, Sel($e_i$, 1.0) is defined where Sel($e_i$, g) increases exponentially with g, up to Sel($e_i$, 0.0)=1.0.

To compute the search cost for $e_j$ (j=1, 2) and a grade g, the text engine that handles attribute $A_j$ was assumed to have an inverted file for $A_j$. Given a query, the engine retrieves the inverted lists for the query terms. Processing these lists has an initial cost $c_i$, a cost per entry of the inverted file that is processed $c_r$, and a cost $c_t$ of transmitting the id of each matching object. Also, cg is the cost of computing the grade for one object and the given value for the attribute.

To compute the probing cost for $e_1$, the repositories are assumed to include a hash table that, given an object id o, returns the weight vector associated with o. The cost of Probe for an object is then estimated as the sum of the initial cost $c_i$, the cost of accessing two random disk blocks 2*$c_d$, the cost to compute the grade for o $c_g$, and the cost to output the result $c_t$.

To compute the probing cost for $e_2$, it was assumed that there is no hash table for probing attribute $A_2$, and so a probe is processed as a search with the lowest grade.

Expressions $e_3$, $e_4$, and $e_5$: To compute the selectivities and search costs associated with these expressions, the repositories are assumed to manage their attributes using R trees. Furthermore, the methodology presented in the prior art is used to estimate these parameters, based on the fractal dimension of the set of data. The fractal dimension of a set of data is a number that can be efficiently computed, and characterizes the distribution of the data. Given a range query, the fractal dimension associated with the data allows for accurate estimates of the selectivity of the query and the number of nodes of the R tree that are accessed when processing the query.

For our experiments, the real dimension D (i.e., the dimension of the corresponding feature vectors) for attributes $A_3$, $A_4$, and $A_5$, and their fractal dimension d are defined. The methodology used is disclosed in "Generalizing GLOSS for vector-space databases and broker hierarchies. In Proceedings of the 21st International Conference on Very Large Data Bases (VLDB '95), pages 78–89, September 1995.

To compute the probing costs, it is assumed that $A_3$ and $A_4$ scan the entire database to look for the feature vector of the object being probed, whereas $A_5$ has a hash table for this task, like $A_1$.

5.1 Search-minimal Executions and Post-optimization

Table 2 shows the base values of the parameters for the experiments, for the five atomic expressions that are considered.

TABLE 2

| Expression | Sel(e, 1.0) | D | d | $c_i$ | $c_t$ | $c_j$ | $c_g$ | $c_d$ |
|---|---|---|---|---|---|---|---|---|
| $e_1$ | $3 \times 10^{-6}$ | n/a | n/a | .15 s. | $10^{-5}$ s. | .006 s. | .0002 s. | 0.02 s. |
| $e_2$ | $7 \times 10^{-6}$ | n/a | n/a | .15 s. | $10^{-5}$ s. | .006 s. | .0002 s. | 0.02 s. |
| $e_3$ | n/a | 9 | 9 | .15 s. | n/a | .006 s. | .0002 s. | 0.02 s. |
| $e_4$ | n/a | 7 | 3 | .15 s. | n/a | .006 s. | .0002 s. | 0.02 s. |
| $e_5$ | n/a | 10 | 4 | .15 s. | n/a | .006 s. | .0002 s. | 0.02 s. |

Table 3 shows a comparison of the search-minimal executions against executions that choose the search condition without considering the probing cost.

TABLE 3

| Sel(e, 1.0) | % Improved Queries | % Improvement |
|---|---|---|
| $1 \times 10^{-6}$ | 87.65 | 27.62 |
| $2 \times 10^{-6}$ | 89.30 | 28.35 |
| $3 \times 10^{-6}$ | 94.24 | 33.65 |

The cost of the best search-minimal execution can be compared against the cost of the execution of the following strategy, called Sep. Strategy Sep is determined by first choosing the best atomic condition on which to search, considering the search cost and the selectivity of the conditions, but not the probe costs. Then, Sep probes the remaining conditions in an optimal order. The search-minimal strategy of the present invention differs from Sep in that the probing costs are taken into account when choosing the condition on which to search. Table 3 compares the cost of a search-minimal execution versus the cost of the Sep strategy. The base values of the parameters of Table 2 are used, except that Sel($e_2$, 1.0) is varied. (The selectivity of $e_2$ for the other grades increases exponentially from that point up to Sel($e_2$, 0.0)=1.0, as explained above.) Also, the grade for each of the five atomic conditions is chosen from the set {0.7,0.8,0.9} to obtain $3^5$=243 different queries. Table 3 shows that even for the simple query form considered, improvements in the execution time of an overwhelming majority of the queries were obtained. For example, when Sel($e_2$, 1.0)=$3 \times 10^{-6}$, the search-minimal strategy of the present invention outperformed Sep for 94.24% of the 243 queries. The Sep strategy was on average 33.65% more expensive for these queries.

Given a conjunctive query, the search-minimal strategies search objects on only one atomic condition. To test whether more could be gained by considering more complicated strategies that search more conditions, the following experiments were run. The best strategy to process the conjunctive query can be found by exhaustively considering all possible nonempty subsets of the atomic conditions to retrieve the objects, and then probing the remaining conditions optimally. This strategy is called Exh. Then, the best search-minimal strategy as in Section 3 is executed, and a simple post-optimization to it is performed. (See, e.g., Section 3.4.) In particular, each condition that needs to be probed is considered (i.e., each condition other than the only one used for retrieving the objects), and compare the cost of probing against the cost of searching for the condition. If the cost of searching is less than the cost of probing the condition for the estimated number of objects that will require this probing, then this condition is searched instead of probed. Such a change implements multiple probes to the condition by executing a single retrieval of all the objects that satisfy the condition, if this is cheaper. This resulting strategy is called "PostOpt".

Table 4 shows a comparison of the post-optimized search-minimal executions performed according to the present invention against the overall optimal executions that consider all possible subsets of the conditions to retrieve objects.

TABLE 4

| Sel($e_2$, 1.0) | % Non-Optimal Queries | % Difference | Times Postopt, Applied |
|---|---|---|---|
| $5 \times 10^{-6}$ | 0 | 0 | 1.33 |
| $6 \times 10^{-6}$ | 7.41 | 0.50 | 1.41 |
| $7 \times 10^{-6}$ | 7.41 | 0.49 | 1.41 |

To compare the cost of the PostOpt strategies against the cost of the optimum Exh strategies, experiments were run similar to the ones of Table 3. Table 4 shows some results for the same conjunctive queries, for different values of Sel($e_2$, 1.0), as before. The table shows that in only very few cases did the exhaustive strategy outperform the post-optimized strategy, and when it did, the difference in cost is less than 1% on average. For example, when Sel($e_2$, 1.0)=$6 \times 10^{-6}$, for only 7.41% of the queries was PostOpt not optimal. The last column of the table shows the average number of conditions per query that were transformed into search conditions during post-optimization. For example, when Sel($e_2$, 1.0)= $6 \times 10^{-6}$, an average of 1.41 conditions (out of a maximum of four) where changed from probes into searches during post-optimization. In summary, for a conjunctive query like the one used in this section, applying a simple post-optimization to the search-minimal strategy found as in Section 3 results in almost optimal strategies most of the times.

5.2 Ranking Expressions verses Filter Conditions

The following reports the experimental advantages of the present invention in mapping the execution of a ranking expression into the execution of a filter condition over the prior art, and particularly Fagin's method. According to Theorem 4.5, if a repository is continuously graded, there is a search-minimal execution for the filter condition that is expected to access no more objects than Fagin's algorithm for processing the ranking expression directly.

However, in practice, repositories might not be continuously graded. Even if if such repositories are continuously graded, the statistics that are kept to determine the selectivity of the atomic expressions for the different grades might not be "fine" enough for the theorem to hold.

For example, the statistics that are kept about an attribute might provide the selectivity of atomic conditions for that attribute at discrete grade points (e.g., at grades 0, 0.1, 0.2, . . . , 1).

Such a case is considered below where the grade granularity for selectivity estimates is either 0.1 or 0.01.

The experiments in this section use two different ranking expressions over the set of five atomic expressions defined above:

$R_{Min}$:Min($e_1, e_2, e_3, e_4, e_5$)
$R_{Max}$:Max($e_1, e_2, e_3, e_4, e_5$)

Figure 7:
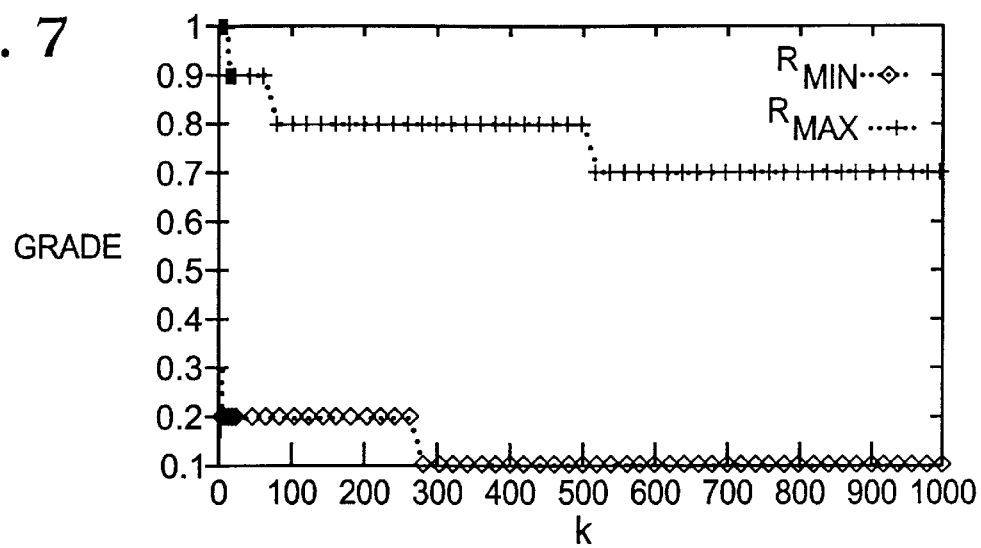
FIG. 7 is a graph showing the grade for the filter condition associated with each of the ranking expressions, as a function of the number of top objects desired.

FIG. 7 shows what grade G should be used to process the filter condition associated with $R_{Min}$ and $R_{Max}$ in order to obtain at least k objects in the answer, for different values of k, where the grade granularity for computing estimates is 0.1. The fact that selectivity statistics are not used for finer grades explains that the curves are not smooth, but have "steps." Note from the figure that $R_{Max}$ requires significantly higher grades than $R_{Min}$. Therefore, in general, fewer objects for $R_{Max}$ will have to be retrieved from the conditions used for searching.

Figure 8:
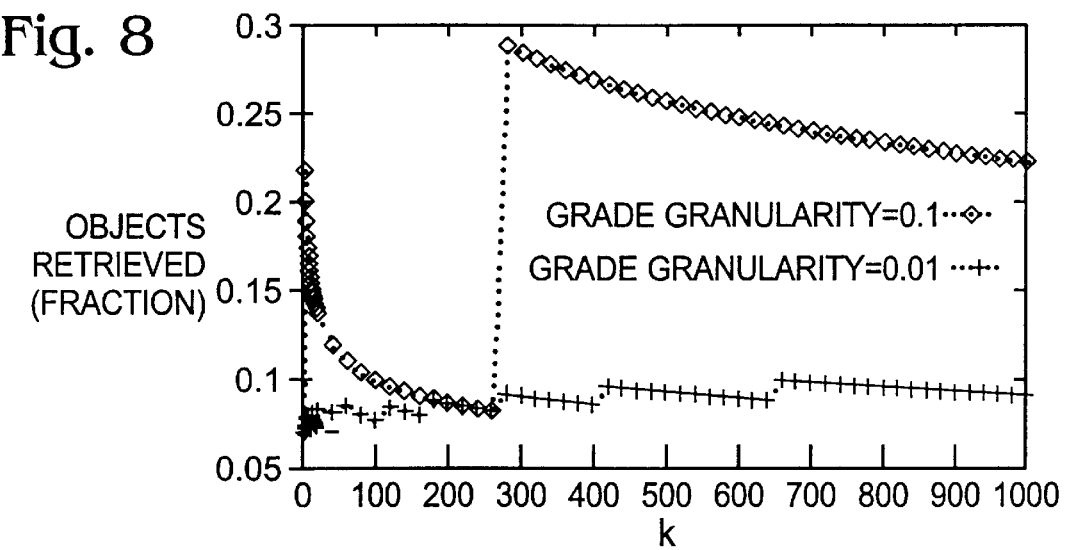
FIG. 8 is a graph showing the expected number of objects retrieved when processing a Min-based filter condition as a function of the number of top objects desired.

FIG. 8 shows, for each k and for $R_{Min}$, the expected number of objects retrieved using the methodology of the present invention, as a fraction of the number of objects expected to be retrieved when processing the ranking expression using Fagin's methodology. FIG. 8 shows two curves, according-to the granularity of the statistics available to describe the repository, as discussed above. It is apparent from the figure that is even when only coarse statistics are available (grade granularity=0.1), the filter-condition strategy still accesses less than one third as many objects as Fagin's algorithm. This fraction gets even lower when finer statistics are available (grade granularity=0.01). One key point for explaining this behavior is that the filter-condition strategy searches objects from only one of the atomic subconditions, whereas Fagin's method retrieves objects from all of the five subconditions in the query used.

Figure 9:
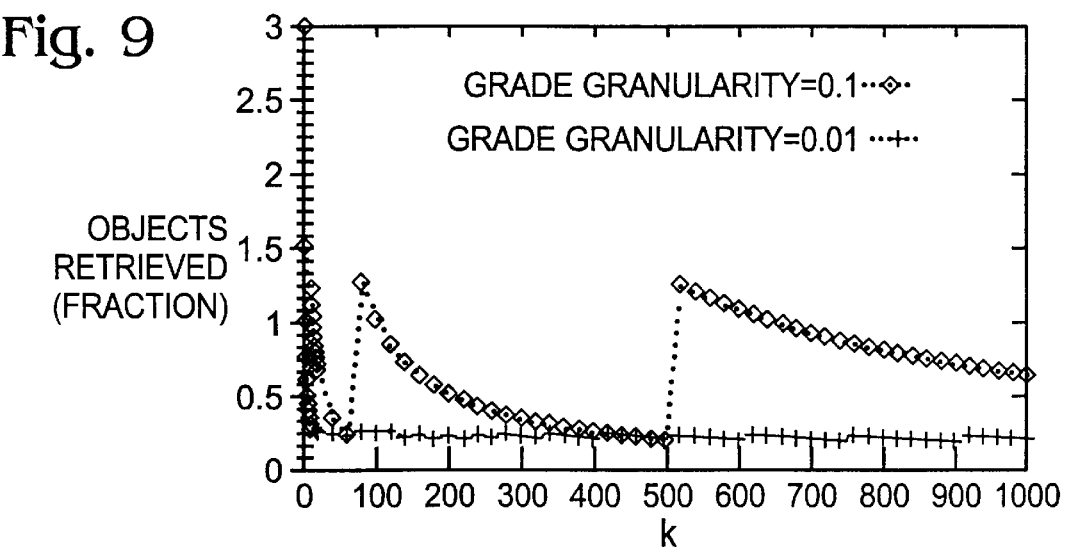
FIG. 9 is a graph showing the expected number of objects retrieved when processing a Max-based filter condition as a function of the number of top objects desired.

FIG. 9 shows similar results for the $R_{Max}$ ranking expression. In this case, the results are not as good as for $R_{Min}$, because both strategies retrieve objects from all of the five atomic subconditions. Actually, when the grade granularity is 0.1, the filter-condition strategy of the present invention accesses slightly more objects than Fagin's method. This phenomenon disappears when the grade granularity is 0.01, except for k=1 and k=2. For larger values of k, the filter-condition strategy of the present invention accesses significantly fewer objects. The reason of this behavior for k=1 is that there are an expected seven objects that match expression $e_2$ with grade one, for example. Prior art methods such as Fagin only need to retrieve one object per expression to get the top object for a Max expression. However, for k≧3 the situation changes significantly. For example, for k=10, the filter-condition strategy accesses only an expected 30% of the objects that Fagin's method is expected to retrieve.

Having described and illustrated the principles of the invention in a preferred embodiment thereof, it should be apparent that the invention can be modified in arrangement and detail without departing from such principles. We claim all modifications and variation coming within the spirit and scope of the following claims.

We claim:

1. A method for optimizing a search over a multimedia database including a plurality of objects having at least two different searchable attributes, said method comprising:
   optimizing a given filter condition, said filter condition containing a plurality of subconditions;
   accessing statistics from a database based on a cost to process a particular subcondition;
   choosing a subcondition to process based on the cost information;
   sending a query on the chosen subcondition to retrieve all of the objects that satisfy the subcondition from the multimedia database;
   evaluating the other subconditions on the retrieved objects; and
   translating a ranking expression into a filter condition, and handling the processing of the ranking expression as the processing of the filter condition followed by a simple is ordering step.

2. The method of claim 1, further including requesting a specified number of top objects which fulfill the filter condition.

3. The method of claim 2 wherein the translating step includes:
   estimating a grade necessary to retrieve at least the specified number of top objects requested; and
   using the grade to translate the ranking expression into the new filter condition.

4. The method of claim 3, wherein the estimating step includes:
   maintaining information for each attribute, said information including the distribution of values for each attribute; and
   accessing the information to determine the necessary grade.

5. A method for optimally retrieving selected multimedia objects from a multimedia repository, the method comprising:
   storing a plurality of multimedia objects in the multimedia repository;
   defining at least two attributes over which the multimedia repository may be searched;
   selecting a filter condition using the attributes to be searched;
   searching the multimedia repository over the defined multimedia attributes;
   selecting the multimedia objects which fulfill the filter condition; and
   retrieving the selected objects.

6. The method of claim 5, further including:
   determining a set of attributes of the defined multimedia attributes that can be searched over the multimedia repository for the least cost; and
   searching the multimedia repository over the determined attributes.

7. The method of claim 6, wherein the defined multimedia attributes includes a second attribute, the method further including:
   determining the cost to search the multimedia repository for the attributes that were not chosen as search attributes;
   determining the cost to probe the selected objects for the these attributes;
   comparing the searching cost with the probing cost for the these attributes; and
   searching the multimedia repository for an attribute if the search cost of the attribute is lower than the probe cost of the attribute, otherwise probing the multimedia repository for the attribute.

8. The method of claim 7, further including:
   determining a ranking expression for each object in the multimedia repository, said ranking expression representing a composite grade of match over all of the selected attributes; and ordering the retrieved objects according to a rank computed by the ranking expression of the query.

9. The method of claim 7, further including:

determining a ranking expression for each object in the multimedia repository, said ranking expression representing a composite grade of match over all of the selected attributes;

requesting a desired number of objects to retrieve; and retrieving only the desired number of objects according to the ranking expression.

10. The method of claim 5, further including:

determining a ranking expression for each object in the multimedia repository, said ranking expression representing a composite grade of match over all of the selected attributes;

requesting a desired number of objects to retrieve; and converting the ranking expression to a filter condition; and searching over the converted ranking expression, thus retrieving fewer useless objects than would be retrieved without using the filter condition.

11. The method of claim 10, further including:

determining a first ranking expression grade from a first attribute that would retrieve at least a sufficient number of objects; and selecting those objects from the multimedia repository which fulfill the first ranking expression grade for the first attribute.

12. The method of claim 10, further including determining a second ranking expression grade from a second attribute which would retrieve at least a sufficient number of objects; and selecting those objects from the multimedia repository which fulfill the second ranking expression grade for the second attribute.

13. The method of claim 10, further including determining a first ranking expression grade from a first attribute which is expected to retrieve at least a sufficient number of objects;

determining a second ranking expression grade from a second attribute which is expected to retrieve at least a sufficient number of objects;

determining a maximum grade and associated filter condition if the ranking expression is the "Max" of the two said ranking expressions, said maximum grade being the maximum of the first ranking expression grade and the second ranking expression grade;

selecting those objects from the multimedia repository which fulfill the associated filter condition.

14. The method of claim 10, further including determining a first ranking expression grade from a first attribute which is expected to retrieve at least a sufficient number of objects;

determining a second ranking expression grade from a second attribute which is expected to retrieve at least a sufficient number of objects requested;

determining a minimum grade and associated filter condition if the ranking expression is the "Min" of the two said ranking expressions, said minimum grade being the minimum of the first ranking expression grade and the second ranking expression grade;

selecting those objects from the multimedia repository which fulfill the associated filter condition.

15. A system for optimally retrieving multimedia objects from a database comprising:

storage means having a plurality of multimedia objects stored therein, said multimedia objects having at least two different searchable attributes;

input means for requesting objects which fulfill criteria specified by a user;

interface means operably linking said storage means and said input means together;

searching means for accessing the storage means and selecting objects which fulfill the criteria specified by the user;

retrieving means for obtaining identifiers representing the selected objects to the input means.

16. The system of claim 15 further including:

a second set of data tables representing the cost to search the storage means over each of the different searchable attributes; and means for accessing the first set of data tables in response to specified criteria from the input means.

17. The system of claim 16 the input means including selection means for allowing a user to input a number of top objects to be retrieved from the storage means, said top objects being those objects in the database which fulfill best the criteria specified by the user.

18. The system of claim 17, further including selection look-up means linked to the first set of data tables for estimating a minimum attribute grade, said searching means selecting only those objects which fulfill the minimum attribute grade.

* * * * *